(12) United States Patent
Eykholt et al.

(10) Patent No.: US 6,260,057 B1
(45) Date of Patent: Jul. 10, 2001

(54) APPARATUS AND METHOD FOR HIGH PERFORMANCE IMPLEMENTATION OF SYSTEM CALLS

(75) Inventors: Joseph R. Eykholt; Steven R. Kleiman, both of Los Altos, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 08/396,600

(22) Filed: Mar. 1, 1995

(51) Int. Cl.[7] ............................................. G06F 9/40
(52) U.S. Cl. ............................................................. 709/102
(58) Field of Search ............................ 395/650, 700, 395/600, 672, 670, 677; 714/25, 38, 46; 709/300, 102, 100, 107, 310; 717/4

(56) References Cited

U.S. PATENT DOCUMENTS

| | | | |
|---|---|---|---|
| 3,707,725 | * 12/1972 | Dellheim | 444/1 |
| 5,274,815 | * 12/1993 | Trissel et al. | 395/700 |
| 5,442,758 | * 8/1995 | Slingwine et al. | 395/375 |
| 5,495,578 | * 2/1996 | Rohrbaugh et al. | 395/185.04 |
| 5,515,538 | * 5/1996 | Kleiman | 395/733 |
| 5,632,032 | * 5/1997 | Ault et al. | 395/670 |

OTHER PUBLICATIONS

H. Y. Sasde et al, "Value Numbering in the Context of Merging Control Flow", IBM TDB, vol. 25, No. 12, pp. 6338–6341, May 1983.*

Article by Robert A. Alfieri, entitled "An Efficient Kernel-Based Implementation of POSIX Threads" published by *Summer Usenix*, Jun. 6–10, 1994.

Article by Kleiman et al., entitled "Symmetric Multiprocessing in Solaris 2.0" published by *SunSoft*.

Article by Powell et al., entitled *"SunOS Multi–thread Architecture"* published by *Usenix*, Winter '91.

Article by Khanna et al., entitled *"Realtime Scheduling in SunOS"* published by *Usenix*, Winter '92.

* cited by examiner

Primary Examiner—Majid A. Banakhah
Assistant Examiner—Sue Lao
(74) Attorney, Agent, or Firm—Squire, Sanders & Dempsey L.L.P.

(57) ABSTRACT

A method and apparatus for bypassing multiple pre-tests and post-tests during a system call when those tests are known to be inapplicable. One or more slow path flags are checked during a system call or TRAP. If the slow path flag is clear, execution follows a fast instruction path, resulting in faster execution for the system call or TRAP. Otherwise execution follows a slow instruction path. The slow path flags are set, cleared, and checked at appropriate times. The invention improves the execution time of a thread in a software process and may be used in a data processing system employing multiple threads. Each thread in the data processing system has its own set of slow path flags. The invention can set, clear and check the slow path flags of each thread independently, in subsets of threads, or in all threads.

27 Claims, 6 Drawing Sheets

APPARATUS AND METHOD FOR HIGH PERFORMANCE IMPLEMENTATION OF SYSTEM CALLS

BACKGROUND OF THE INVENTION

This invention relates to operating system software, and more particularly, to a method and apparatus for decreasing an execution time of system calls in a data processing system.

Data processing systems commonly are controlled by a software program called an "operating system" (OS). The operating system acts as the "brains" of the data processing system and controls the scheduling and execution of other software programs being executed by the data processing system. These other software programs are called "application programs" or "processes". The UNIX operating system is an example of a commonly used operating system. UNIX is a registered trademark in the United States and other countries exclusively licensed through X/OPEN, Ltd. Sun Microsystems, Inc. manufactures a version of UNIX called Solaris, which is a registered trademark of Sun Microsystems, Inc.

An operating system controls the performance of many common system operations, such as printing data to a printer or reading data from a document scanner. Thus, if an needs to read or write data, it does so by "calling" the operating system and requesting that the operating system perform a "system call function." The operating system performs the system call function, such as reading or writing, and returns a result to the application program.

The UNIX operating system is formed of two separable parts: the kernel and the systems programs. Systems programs include system libraries, compilers, interpreters, shells, and other such programs that provide useful functions to application programs user. The kernel provides the file system, CPU scheduling, memory management, and other operating-system functions by responding to system calls from application programs. Conceptually, the kernel sits between the hardware and the application programs. System calls are made by a "trap" to a specific location in the computer hardware. Specific parameters are passed to the kernel on the stack and/or in registers and the kernel returns with a code in specific registers or memory locations indicating whether the action required by the system call was completed successfully. For more detailed information on the UNIX operating system see "The Design of the UNIX Operating System" by Maurice J. Bach, Prentice-Hall, 1986, which is herein incorporated by reference.

Some data processing systems execute application programs that consist of multiple processes. Other data processing systems allow each process to contain multiple "threads." Still other data processing systems allow programs to be re-structured to make use of more than one hardware processor (CPU) at a time. Such programming capabilities are generally embodied in a programming paradigm called "multi-threading." A "thread of control" or more simply, a "thread" is a sequence of instructions being executed in a program. Each thread has a program counter and a stack to keep track of local variables and return addresses. Threads execute independently of other threads. A thread shares the instructions of its process, and most of the data of the process, as well as sharing the operating system state of its process. Each thread may make arbitrary system calls. Threads and the associated controls and services of a multi-threaded system may be implemented as objects.

Multi-threaded systems are described, for example, in "SunOS Multi-thread Architecture" by M. L Powell, S. R. Kleiman, S. Barton, D. Shah, D. Stein, M. Weeks, Proceedings of the USENIX Conference—Winter '91—Dallas, Texas, pages 65–79, which is herein incorporated by reference. Additional information concerning the implementation of the SunOS 5.0 may be found in the following articles; each of which is herein incorporated by reference. S. Kleiman, J. Voll, J. Eykholt, A. Shivalingiah, D. Williams, M. Smith, S. Barton, and G. Skinner, "Symmetric Multiprocessing in Solaris 2.0," COMPCON Spring 1992, p. 181, San Francisco, Calif.; Sandeep Khanna, Michael Sebree, John Zolnowsky, "Realtime Scheduling in SunOS 5.0," USENIX, Winter 1992, San Francisco, Calif.

The software of an operating system typically contains special programs (or "handlers") that execute systems calls from threads. The operating system typically performs certain tests before performing the function requested by the system call. Tests performed by the operating system before the requested system call function is executed by the kernel are called "pre-tests." For example, the operating system may test to determine whether the system is operating in "debug" or "TRACE" mode before executing a system call function. Some pretests have actions associated therewith that are performed when a condition in the pre-test is true. The operating system also typically performs certain tests after performing the function requested by the system call. Tests performed after the requested system call function is executed are called "post-tests." For example, the operating system may test for the existence of non-standard error codes after executing a system call function. Some post-tests have actions associated therewith that are performed when a condition in the post-test is true.

As operating systems have become larger and more complicated, the number of pre-tests and post-tests that the operating system performs in connection with each system call has increased. Because the tests are performed for each system call, even relatively simple system calls that would otherwise execute in a short period of time have begun to take relatively long periods of time to execute. What is needed is a way to avoid execution of multiple pre-tests and pre-tests or post-tests are known to be inapplicable.

Accordingly, there is a need for a way to decrease system call execution times.

SUMMARY OF THE INVENTION

The present invention provides an apparatus and method for "bypassing" multiple pre-tests and multiple post-tests during a system call or TRAP when those tests are known to be inapplicable. The invention uses a "slow path" flag to control the operation of the operating system during a system call. When the slow path flag is set, the operating system executes a "slow" instruction path during the system call. The slow instruction path includes at least one pre-test or at least one post-test and usually includes multiple pre-tests or multiple post-tests. In contrast, when the slow path flag is clear, the operating system bypasses the pre-tests or post-tests to execute a "fast" instruction path. The fast instruction path does not contain the pre-tests (or post-tests) that are included in the slow instruction path. Because the fast instruction path contains a subset of the instructions in the slow instruction path, use of the fast instruction path improves the execution time of the system call.

These and other advantages of the present invention will become more fully apparent when the following detailed descriptions of the invention are read in conjunction with the accompanying drawings.

BRIEF DESCRIPTION OF THE DRAWINGS

The invention will now be described with reference to the accompanying drawings, wherein.

DETAILED DESCRIPTION OF THE PREFERRED EMBODIMENT

The following description is of the best presently contemplated modes of carrying out the invention. This description is made for the purpose of illustrating the general principles of the invention and is not to be taken in a limiting sense.

1. GENERAL DISCUSSION OF MULTI-THREADED SYSTEMS

The implementation described is a portion of the SunOS 5.4 Operating System to be released under the name Solaris 2.4 by Sun Microsystems, Inc. "Solaris," "Sun Microsystems" and "SunOS" are registered trademarks, of Sun Microsystems, Inc. A general understanding of the UNIX Operating System as described in the referenced text by Bach, as well as a general understanding of multi-threading explained in the reference by Powell et al. is assumed. While this description of the present invention is made in terms of SunOS 5.4 it will be clear to those skilled in the art that the method and apparatus described herein may be implemented in various multi-threaded operating systems and in various configurations, makes, or models of tightly coupled processors.

This first section of this document provides a general discussion of multi-threading in SunOS 5.4, in which a preferred embodiment of the invention is implemented. A second section of the document discusses improvement of execution time in a preferred embodiment of the invention.

Figure 1:
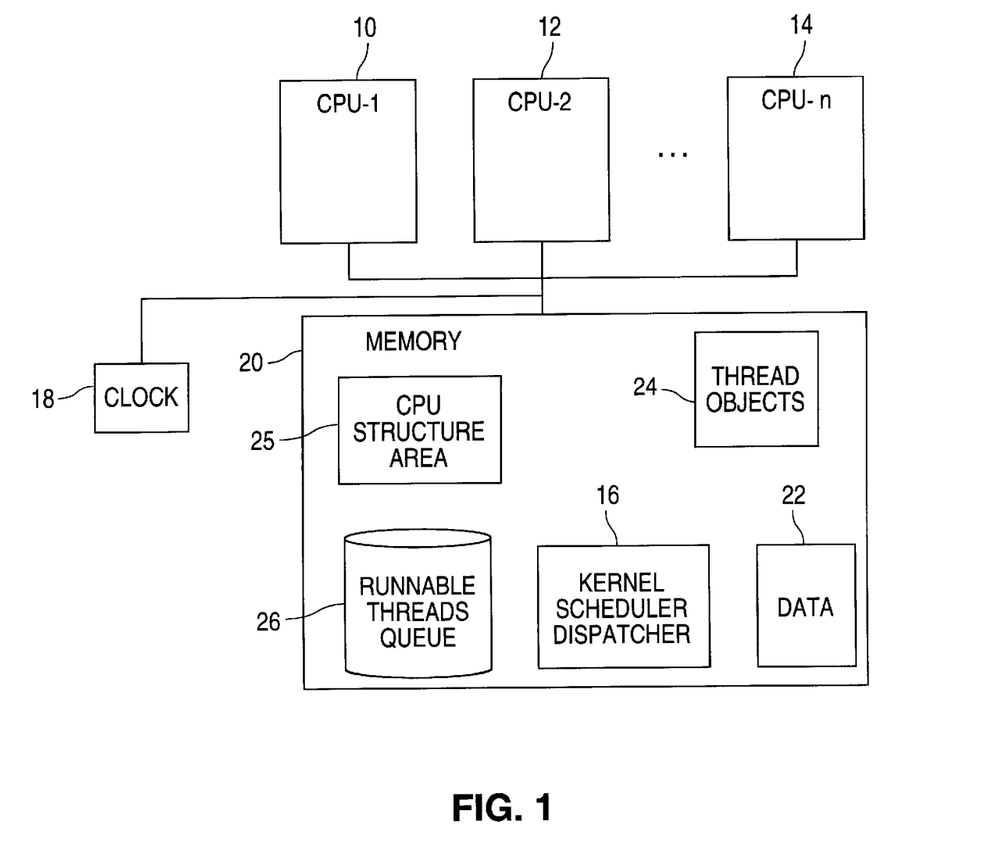
FIG. 1 illustrates a general architecture of a data processing system.

SunOS 5.4 is intended to run on uni-processors and tightly-coupled shared memory multiprocessor systems. Referring now to FIG. 1, the computer system is assumed to have one or more central processor units (CPUs) 10,12,14 sharing a memory 20 and clock 18. The kernel 16 assumes all processors are equivalent. Processors 10,12,14 execute kernel threads selected from a queue of runnable kernel threads 26. If a particular multiprocessor implementation places an asymmetric load on the processors (e.g., interrupts) the kernel 16 will nonetheless schedule threads to processors 10,12,14 as if they were equivalent. In general, all processors 10,12,14 see the same data in memory 20 and share data 22. All of the processors 10, 12, 14 in the system can execute the shared kernel code simultaneously, and use the data structures in the shared memory 20 to communicate between the processors 10, 12, 14 as required.

The CPU structure area 25 contains a data structure for each processor 10, 12, 14. These per-processor structures contain per-processor data, such as: currently executing thread, idle thread, current dispatching priority, and interrupt handling information.

Kernel threads represent the fundamental entities that are scheduled and dispatched on any of the CPUs in the system. A kernel thread is preferably very lightweight, having only a small data structure and a stack. When switching between kernel threads it is not necessary to change virtual memory address space information, so it is relatively inexpensive.

Kernel threads are fully preemptible and may be scheduled by any of the scheduling classes included with the system, including the real-time (fixed priority) class. Since all other execution entities are built using kernel threads, they represent a fully preemptible, real-time "nucleus" within the kernel. "Preemption" is the action whereby a runnable thread with a higher dispatching priority may force a CPU to cease executing a thread with a lower dispatching priority in favor of executing the higher dispatching priority thread. Kernel threads synchronize using synchronization primitives that support protocols for preventing dispatching priority inversion, so a thread's priority is determined in accordance with the activities it is impeding (by holding locks) the service it is performing. Kernel threads are used to provide asynchronous kernel activity, such as asynchronous writes to disk, servicing STREAMS queues, and call-outs. (A "STREAM" is a fill-duplex connection between a process and a device driver, designed to provide flexibility and modularity for the I/O subsystem within a UNIX system.) This removes various diversions in the idle loop and trap code and replaces them with independently scheduled threads. Not only does this increase potential concurrency (these activities can be handled by other CPUs), but it also gives each asynchronous activity a priority so that it may be appropriately scheduled. Each thread has an associated data structure called a "thread object" 24 stored in memory 20. Thread objects are discussed in more detail in connection with FIG. 3.

Figure 2:
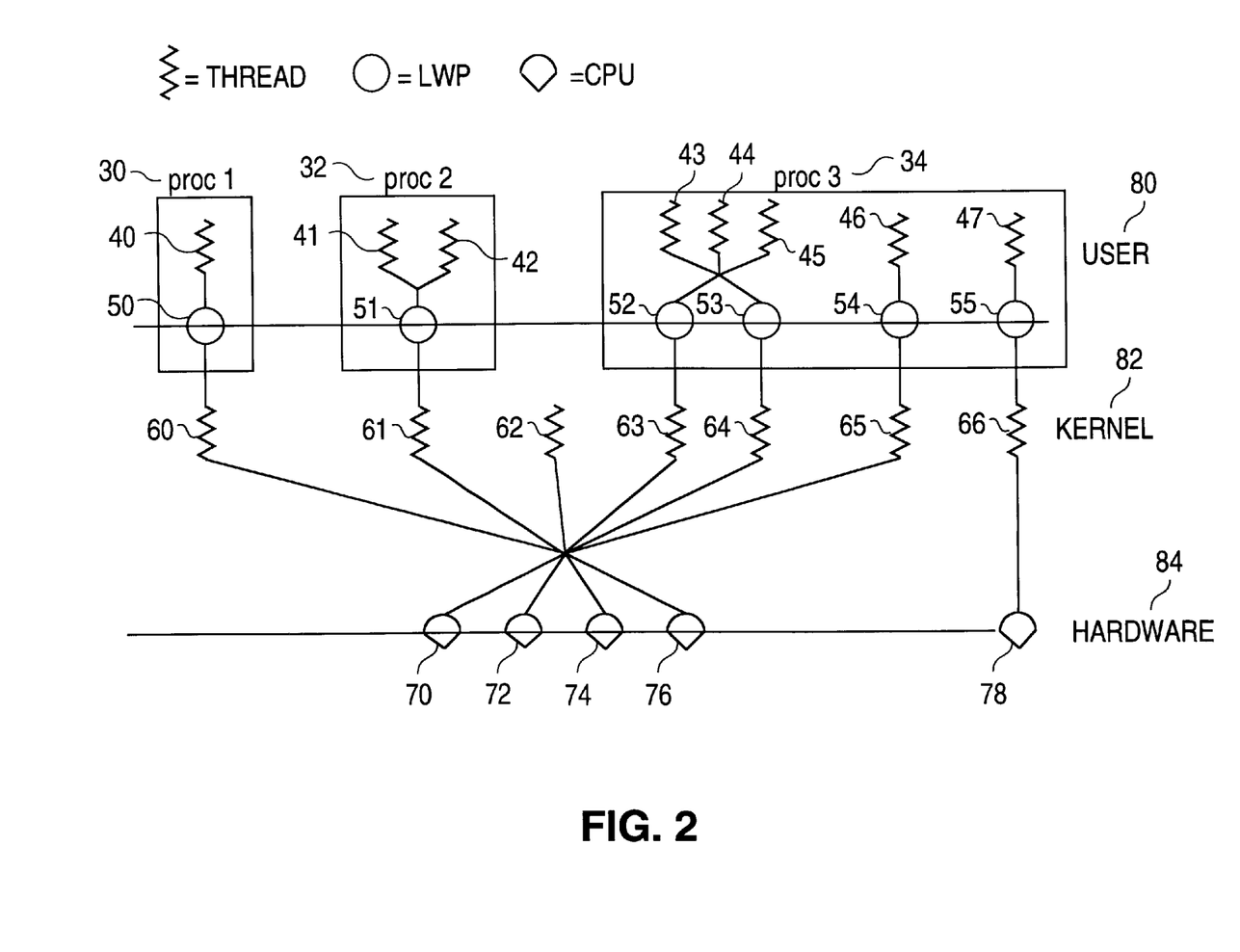
FIG. 2 illustrates a general architecture of a multi-threaded, multi-processor system.

FIG. 2 illustrates the relationship of a traditional single threaded process 30 and multi-threaded processes 32, 34 to the user-level software 80, kernel 82, and processor hardware 84 in a multi-threaded system. The multi-threaded programming model has two levels in the user-level software area 80: threads 40–47, and Light Weight Processes (LWPs) 50–55. In the multi-threaded paradigm, programmers write programs using threads (which may be thought of as independent program execution entities). A multi-threaded UNIX process can have several threads of control, which can run independently on different CPUs. User threads are implemented by the library and are not known to the kernel. To the kernel, the LWP is the execution part of a traditional UNIX process. LWPs are implemented by the kernel. User threads are implemented using LWPs in the following way: User threads are actually represented by data structures in the address space of a program. An LWP chooses a user thread to run by locating the user thread state in the program's memory. Loading the registers and assuming the identity of the user thread, the LWP executes the user thread's instructions. If the user thread cannot continue, or if other user threads should be run, the LWP saves the state of the user thread back in memory. The LWP can now select another user thread to run. Because a user thread is implemented by an LWP, the capabilities of a user thread are the same as those of an LWP. When a user thread needs to access a kernel service by performing a system call, or to interact with user threads in other UNIX processes, it does so as an LWP. The user thread needing the system call remains bound to the LWP executing it until the system call is completed. If a user thread needs to interact with other user threads in the same program, it can do so without involving the operating system. Switching from one user thread to another occurs without the kernel knowing it. Just as the UNIX "stdio" library routines (fopen( ), fread( )) are implemented using the UNIX system calls (open, read), the user thread interface is implemented using the LWP interface, and for many of the same reasons.

Returning again to FIG. 2, kernel threads 60–61, and 63–66 are associated with the LWPs 50–55. Kernel threads 60–66 represent the fundamental entities that are scheduled and dispatched on any of the CPUs 70, 72, 74, 76, 78 in the system. Like the LWP, a kernel thread may be very lightweight having only a small data structure and a stack. The third process 34 has a thread 46 permanently bound to LWP 54, and in addition, the process 34 has asked the system to bind one of its LWPs 55 to a CPU 78. The bound and unbound threads 40–47 can still synchronize with each other both within each process 30, 32, 34 and between processes 30, 32, 34 in the usual way by means of mutex locks, condition variables, semaphores, or readers/writer locks. The kernel supports the execution of user LWPs by associating a kernel thread 60–61, 63–66 with each LWP 50–55. While all LWPs 50–55 have a kernel thread, not all kernel threads have an LWP, (note kernel thread 62 for example). This type of kernel thread 62, with no LWP associated, would be used for handling interrupts, executing STREAMS code, or providing Network File System (NFS) service, for example.

Kernel threads 60–66 represent a thread of control inside the kernel 82. They are scheduled to execute on the processors 70, 72, 74, 76, 78 available to the kernel 82 within the shared kernel address space. A kernel thread contains the following state:

a stack,
a set of registers,
a pointer to thread local storage,
a state flag,
a priority, and
a processor affinity mask. Typically, the stack is used for thread local storage. Every thread logically has its own set of registers. The state flag indicates whether a thread is running or blocking. The priority is used for scheduling. The processor affinity mask is used to restrict the thread to running on a subset of the available processors.

The function "thread_create( )" creates a new kernel thread having a stack of a specified size, at a specified address, a procedure entry point, and an argument to be passed to the procedure. A routine "thread_exit( )" terminates a current thread.

2. IMPROVEMENT OF EXECUTION TIME

In the present invention, pre-tests and post-tests occur mainly during system calls to the kernel, and during TRAPs. TRAPs are initiated, e.g., by synchronous or asynchronous events. Both system calls and TRAPs are discussed below in more detail.

Figure 3:
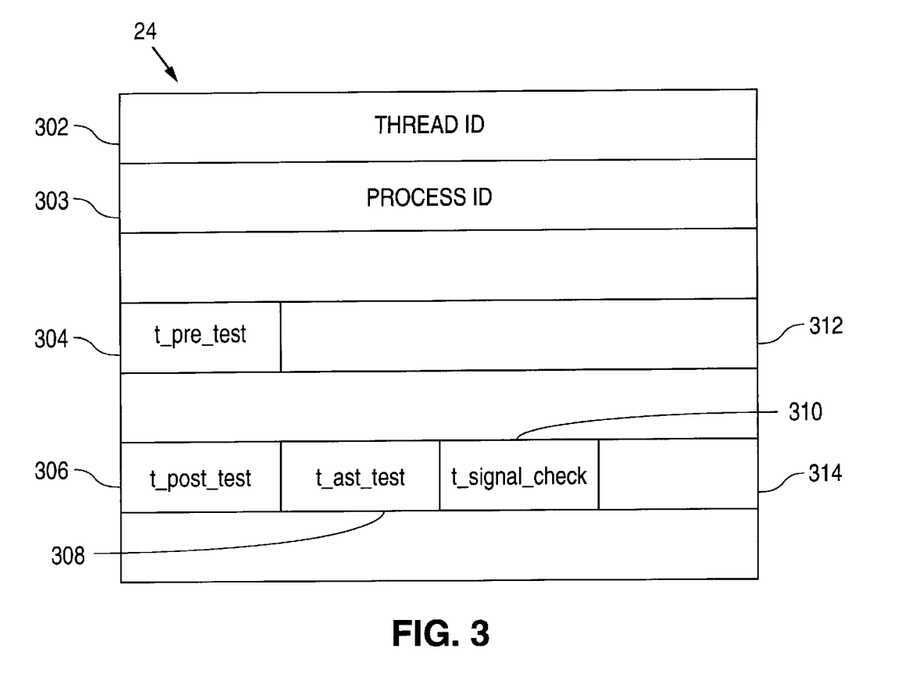
FIG. 3 is a data structure in a memory of FIG. 1 showing examples of slow path flags for a thread.

FIG. 3 shows a "thread object" data structure 24 stored in memory 20 of FIG. 1. In the present invention, each active thread has a data structure akin to thread object 24. Many of the fields in thread object 24 are not germane to the present invention and will not be described in detail herein. As will be understood by persons of ordinary skill in the art, an instance of thread object 24 includes data describing a current state of a thread. Thread object 24 includes a thread ID field 302 that identifies the thread associated with a particular thread object and a process ID field 303 that identifies a process of which the thread is a part. Thread object 24 also includes a t_pre_test flag 304, a t_post_test flag 306, a t_ast_test flag 308, and a t_signal_check flag 310. The uses of flags 304, 306, 308, and 310, which are collectively termed "slow path" flags are described below in more detail.

In the described implementation, flag 304 takes up a partial word of memory 20. The rest of the word contains field 312. Similarly, flags 306, 308 and 310 take up part of another word of memory 20. The rest of this word contains field 314. Fields 312 and 314 are not necessary to implement the present invention and are not described herein. In the described embodiment, flags 306, 308, and 310 are contained in a single word. This arrangement allows for efficient checking of these flags, but is not required to implement the invention. The present invention may be implemented with any grouping or arrangement of slow path flags 304, 306, 308, and 310. Other implementations may use other types of slow path flags.

Figure 4:
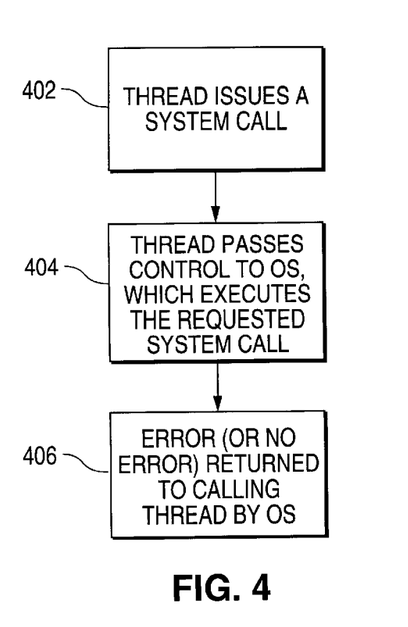
FIG. 4 is a flow chart showing steps performed by a thread to execute a system call.

FIG. 4 is a flow chart showing steps performed by a thread to execute a system call to the kernel. It should be understood that the steps in FIGS. 4–10 identified as being performed by a thread or by the kernel are implemented as program instructions of a thread or of the kernel being executed by an associated CPU. These program instructions are stored in memory 20 or in any other appropriate memory of the data processing system. In FIG. 4, the thread first issues a system call in step 402, which passes control to the kernel of the operating system. In step 404, the operating system executes the requested system call and, in step 406, the operating system returns an error code to the calling thread. Details of the system call are discussed below in connection with FIG. 6.

Figure 5:
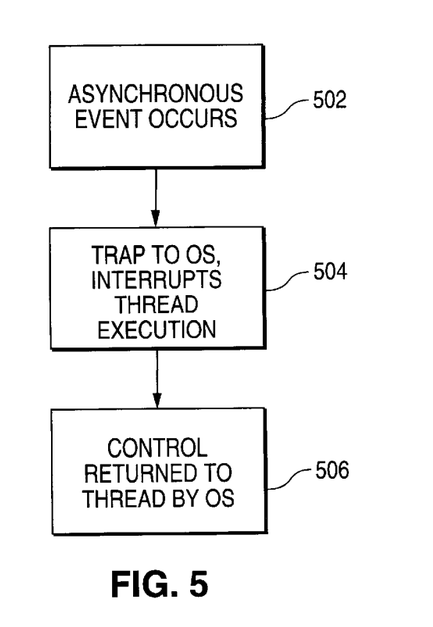
FIG. 5 is a flow chart showing steps performed by the kernel due to the occurrence of a synchronous or an asynchronous event TRAP.

FIG. 5 is a flow chart showing steps performed by the operating system kernel due to the occurrence of a synchronous or asynchronous event. An asynchronous event is an event that can occur at any time, such as an interrupt, a signal received from another process, a timer or a key press. A synchronous-event is an event that occurs immediately upon some program action. As shown in FIG. 5, when an event occurs in step 502, the operating system issues a TRAP in step 504, which passes control to the kernel of the operating system. In step 506, the kernel returns an error code from the TRAP routine to the thread. Details of the TRAP routine are discussed below in connection with FIG. 8.

Figure 6:
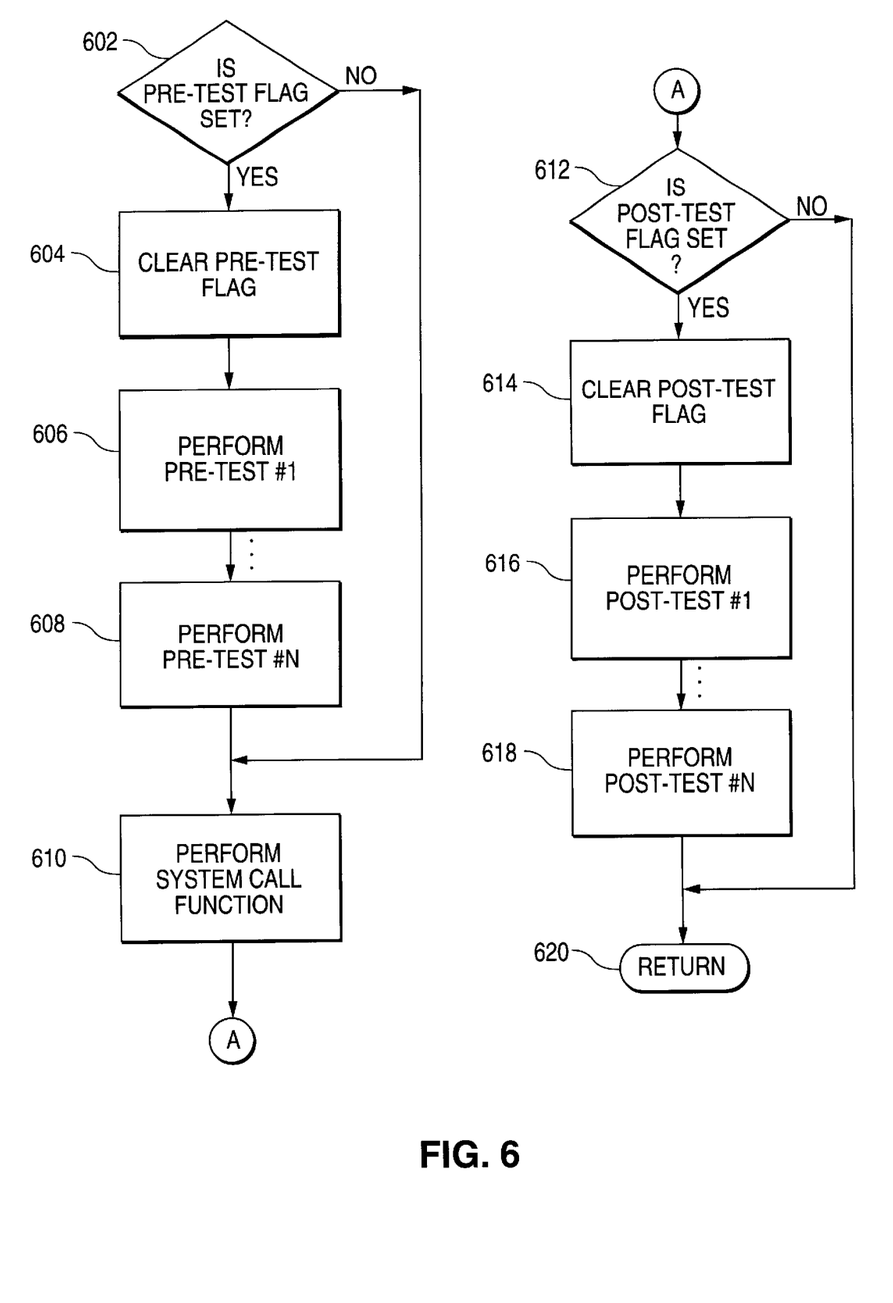
FIG. 6 is a flow chart showing steps performed by the kernel during a system call.

FIG. 6 is a flow chart showing steps performed by the kernel during a system call. Control passes to the steps of FIG. 6 from step 404 of FIG. 4. When the kernel begins processing a system call, it first determines whether a pre-test flag is set in step 602. Flag 304 of FIG. 3 is an example of a pre-test flag. The pre-test flag is also called a "slow path" flag. If the pre-test flag is set, the kernel clears the pre-test flag in step 604 and performs multiple pre-tests 1 . . . N in steps 606–608. The nature of the pre-tests themselves is discussed below in connection with FIG. 7. If the pre-test flag is clear in step 602, the kernel bypasses the pre-tests 1 . . . N and control passes to step 610. Thus, if the pre-test flag is clear, the kernel performs a fast instruction path including step 610, but excluding steps 604, 606, and

608. If the pre-test flag is set, the kernel performs a slow instruction path including steps 604 through 610. The fast instruction path is a subset of the slow instruction path. Thus, the slow instruction path contains more instructions than the fast instruction path and takes more time to execute.

In step 610, the kernel performs the requested system call function. For example, the kernel may read or write data or may return a process ID for the current thread. After the requested system call function has been performed, the kernel determines whether a post-test flag is set in step 612. Flags 306, 308, and 310 of FIG. 3 are examples of a post-test flag. The post-test flag is another type of slow path flag. If the post-test flag is set, the kernel clears the post-test flag in step 614 and performs multiple post-tests 1 . . . N in steps 616–618. The nature of the post-tests is discussed below in connection with FIGS. 7 and 8. If the post-test flag is clear, the kernel bypasses the post-tests 1 . . . N and control passes to step 620. Thus, if the post-test flag is clear, the kernel performs a fast instruction path including step 620, but excluding steps 614, 616, and 618. If the post-test flag is set, the kernel performs a slow instruction path including steps 614 through 620. The fast instruction path is a subset of the slow instruction path. Thus, slow instruction path contains more instructions than the fast instruction path and takes more time to execute.

Figure 7:
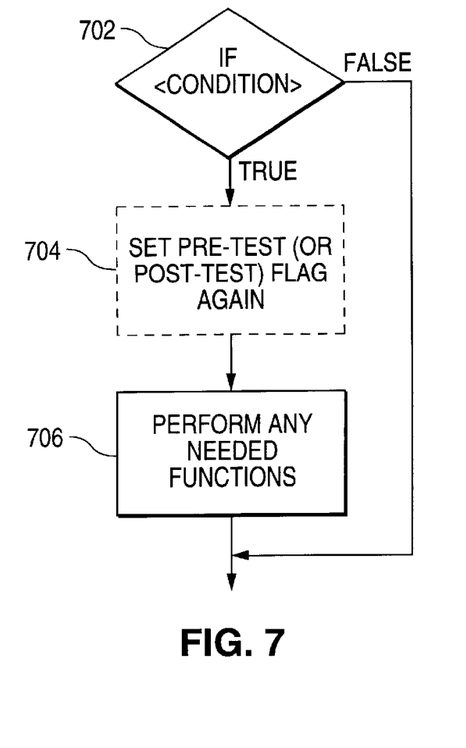
FIG. 7 is a flow chart showing additional steps performed by the kernel during a system call.

FIG. 7 is a flow chart showing additional steps performed by the kernel during a system call. The steps of FIG. 7 correspond to one of the pre-tests or one of the post-tests of FIG. 6 (or a post-test of FIG. 8). Thus, for example, if a system call includes N pre-tests, and the kernel performs the slow instruction path, the steps of FIG. 7 would be repeated N times, once for each pre-test before the requested system call function is performed. In step 702, a condition is tested. For example, the kernel may test to see whether a TRACE flag is set, indicating that the thread is in a TRACE debugging mode. Examples of conditions tested for as pre-tests in step 702 when the step is part of a pre-test check include:

microstate accounting flag set,
credential change,
single-step hook,
FPU (floating point unit) exception pending hook,
profiling hook,
loadable system call loading and locking,
debugger (TRACE) hook for system call tracing, and
security auditing.

Examples of conditions tested for as post-tests in step 702 when the step is part of a post-test check include:

handle unusual returns (e.g., fork/exec/setcontext),
handle error return (e.g., set carry bit),
debugger (TRACE) hook for post system call tracing (e.g., "truss"),
vfork hook,
MT (Multi-threading) (i.e., whether another LWP in this process wants this LWP to hold in order to fork the process)
signal check (checks multiple possible types of signals),
debugger hook (e.g., xregrestore),
microstate accounting flag,
LWP state change,
scheduling class hook (e.g., CL_TRAPRET),
preemption check flag, and
single step hook.

As will be understood by persons of ordinary skill in the art, the above lists are not exclusive and other pre-test and post-test conditions may also be checked in step 702. The above lists are intended as examples only. In general, any conditions that do not need to be checked during all system calls should be placed in the slow instruction path for pre-tests or post-tests. Similarly, care should be used in the placement of conditions during TRAP, so that as many conditions as possible are placed in a slow instruction path.

The following discussion assumes that FIG. 7 is part of a pre-test, such as step 606 of FIG. 6. A similar description that applies when FIG. 7 is part of a post-test, such as step 614 of FIG. 6 (or the post-tests of FIG. 8) has been omitted for the sake of brevity. If the condition of step 702 is met (e.g., if the TRACE flag is set), then, in certain circumstances, the pre-test flag, which was cleared in step 604, is set again in step 704. Step 704 is shown in dotted lines in FIG. 7 to indicate that it is performed only in certain circumstances. In general, the pre-test flag is set again for what are termed "persistent conditions." For example, when the TRACE flag is set, indicating that the thread is running in TRACE debug mode, it is desirable for the TRACE flag to be tested every time a system call is made. Therefore, the TRACE mode is a persistent condition. At the time when step 704 is executed, the kernel has previously cleared the pre-test flag in step 604 of FIG. 6. If the condition tested in step 702 indicates that the TRACE flag is set, however, and that the TRACE mode is "on", then it is desirable to set the pre-test flag (e.g., t_pre_test of FIG. 3) again so that the kernel will take the slow instruction path again during the next system call. In the example, when the TRACE routine eventually is turned off by the user, the TRACE flag test in step 702 will become false and the pre-test flag will remain cleared, i.e., will not be set again by step 704 because control will not reach step 704.

Step 706 passes control to the portion of the kernel that performs the instructions associated with a response of True in step 702. For example, control may pass to a routine performed when the TRACE flag is set.

Figure 8:
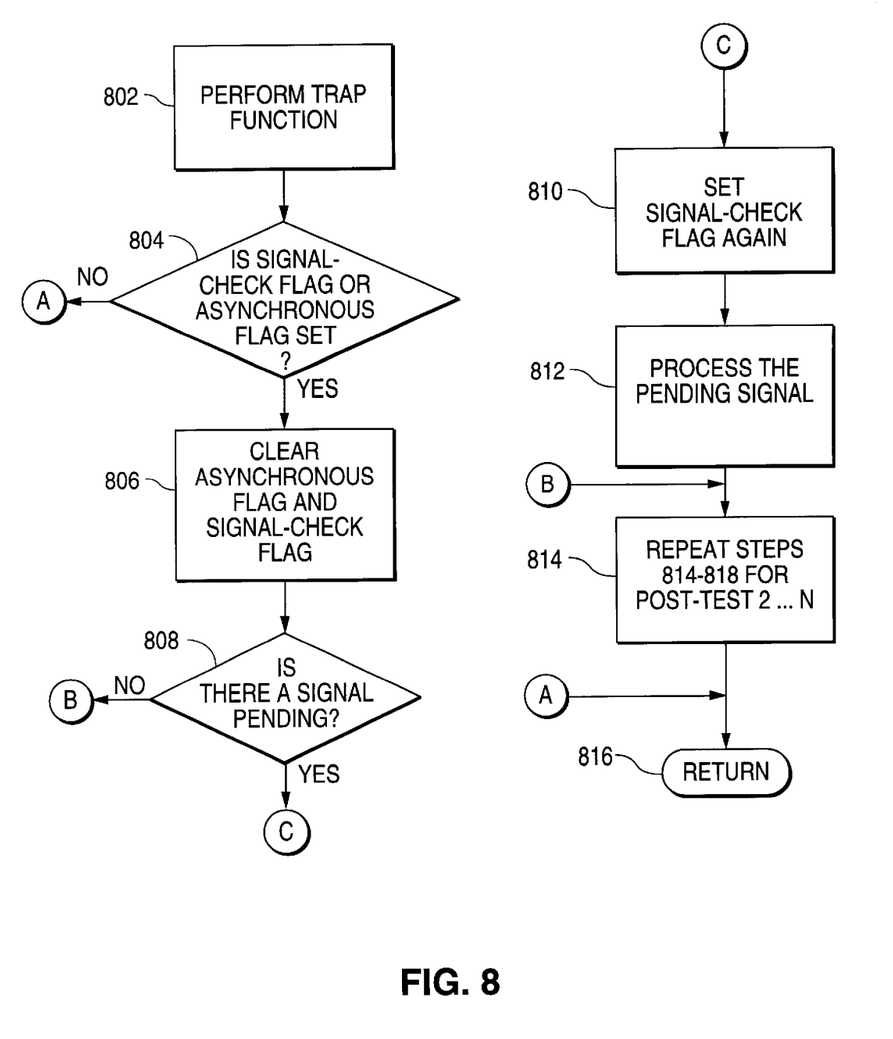
FIG. 8 is a flow chart showing steps performed by the kernel during a TRAP.

FIG. 8 is a flow chart showing steps performed by the kernel during a TRAP. Control passes to the steps of FIG. 8 from step 504 of FIG. 5. As discussed above, a TRAP can be performed as a result of detection of an asynchronous event. A TRAP can also be caused by synchronous events such as an error, a page fault, etc. Although not shown in FIG. 8, in a preferred embodiment, a pre-test flag is tested prior to step 802 and if the pre-test flag is an set, a slow instruction path including pre-test conditions is executed. In step 802, the kernel performs a TRAP function to deal with the TRAP event. For example, the TRAP function could handle a page fault or could deal with a received signal. After the TRAP function has been performed, the kernel determines in step 804 whether either one of an asynchronous-event flag and a signal-check flag is set. An example of an asynchronous-event flag is t_ast_test flag 308 of FIG. 3. An example of a signal-check flag is t signal check flag 310 of FIG. 3. The asynchronous-event flag and the signal-check flag together act as another type of slow path flag. If either of the asynchronous-event flag and the signal-check flag is set in step 804, the kernel clears both the synchronous-event flag and the signal-check flag in step 806 and performs multiple post-tests 1 . . . N in steps 808 through 814. In FIG. 8, steps 808 through 812 form a first post-test and step 814 forms second through Nth post-tests, the details of which are not shown.

For the purpose of example, the nature of the first post-test of FIG. 8 is discussed below in more detail. Step 808 determines if a signal is pending by checking one or more flags (not shown) in memory indicating different types of pending signals. These flags differ from t_signal_check flag 310 of FIG. 3, which indicates whether any signal is pending, because they indicate which specific types of signals are pending. If at least one signal is still pending (after performance of the TRAP function in step 802) the t_signal_check flag is set again in step 810. Thus, the signals that are still pending will be dealt with in the slow instruction path of a next system call or TRAP. It is necessary to check the t_signal_check flag 310 after the TRAP routine because more than one signal can be pending at a time. If no signals are pending in step 808, the t_signal_check flag 310 remains clear. Otherwise, step 812 performs any processing associated with a pending signal. As discussed, the slow instruction path may include multiple post-tests 1 . . N. The details of other post-tests of step 814 are not discussed for the sake of brevity. Any appropriate post-test (i.e., one which is not performed regardless of the state of the signal-check flag and asynchronous-event flag) may be placed in the slow instruction path.

If the slow path flag is clear in step 804, the kernel bypasses the post-tests 1 . . . N and control passes to step 816. Thus, if the slow path flag is clear, the kernel performs a fast instruction path including step 816, but excluding steps 806–814. If the slow path flag is set, the kernel performs a "slow instruction path" including steps 806 through 816. The slow instruction path contains more instructions than the fast instruction path because the fast instruction path is a subset of the slow instruction path. Thus, the slow instruction path takes more time to execute. In step 816, control returns to the point where the TRAP occurred.

It will be understood that the post-test flag checking step 804 can also occur during the slow instruction path of FIG. 6 (i.e., after a regular system call). The post-tests of steps 804–814 can also occur in FIG. 6. In this case, checking the signal-check and asynchronous-event flags is considered to be a check of a sub-slow path flag (i.e., a flag that controls entry to a slow path within a slow path).

Figure 9A:
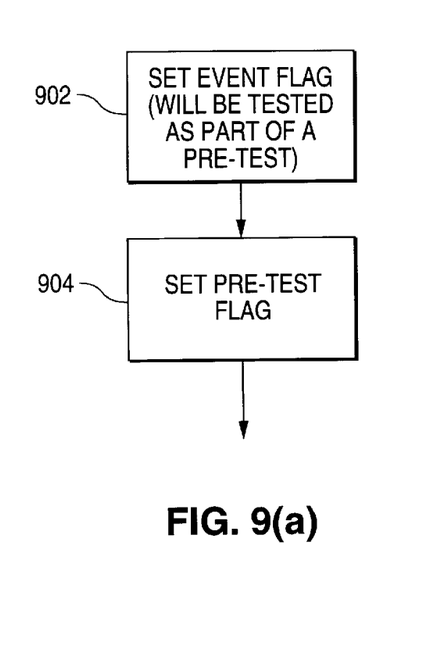
FIGS. 9(a) and 9(b) are flow charts showing a step performed by a kernel routine, where the kernel routine will affect a pre-test or a post-test.
Figure 9B:
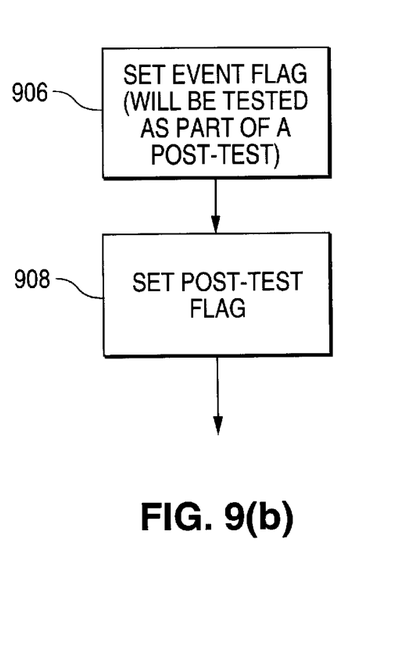
Figure 10:
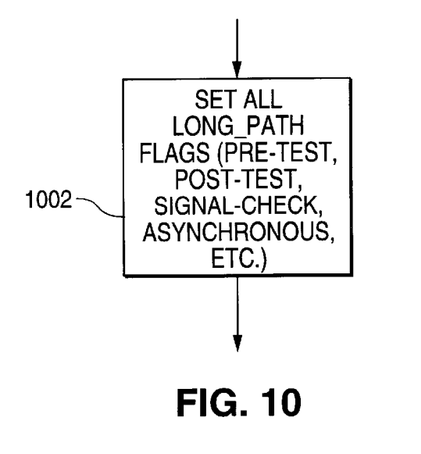
FIG. 10 is a flow chart showing a step performed by a kernel routine that initiates a new thread.

The above discussion of FIGS. 4–8 relates to how the slow path flags are used once they have been set or cleared to control entrance to a long instruction path or a short instruction path. The following discussion relates to the circumstances under which the slow path flags are set and/or cleared. FIGS. 9(a) and 9(b) are flow charts showing a step performed by a kernel routine, where the instructions performed by the kernel routine affects a test performed in a slow instruction path. FIG. 10 is a flow chart showing a step performed by a kernel routine that initializes a new thread. To implement the present invention in a particular operating system kernel, it is necessary to determine which kernel routines perform steps affecting the pre-tests of FIG. 6 or affecting the post-tests of FIGS. 6 and 8.

Whenever the kernel calls a function that affects a pre-test or a post-test, where those tests are located in a slow instruction path, the called routine must set a slow path flag to ensure that the kernel will enter the slow instruction path and check the appropriate pre- or post-test condition when control later enters the slow instruction path. For example, when the kernel calls a TRACE_ON function to initialize the TRACE flag for a thread, the code of the TRACE routine function sets a TRACE flag (to indicate that tracing is "on") and also sets the pretest flag (e.g., t_pre_test) to indicate that the TRACE flag needs to be checked, where this check is a part of the pre-test slow instruction path. Thereafter, once tracing is set to "on", when any system call is performed (see, e.g., FIG. 4), the fact that the pre-test flag is set causes the kernel to execute the slow instruction path prior to performing a requested system call function, including the routine required to check the TRACE flag and perform the tracing function. It will be understood that improvement of execution time in the present invention occurs during those times when a system call is made (or a TRAP is performed) and the slow path flag or flags remain clear. For example, if the t_pre_test and t_post_test flags of FIG. 3 are clear, the kernel will execute a "get process id" system call about five times as fast as if both flags were set.

Step 902 of FIG. 9(a) sets an event flag, such as a TRACE flag. This event flag will be tested in a pre-test condition in the slow instruction path when a system call is performed. Step 904 of FIG. 9(a) indicates that certain kernel routines must set certain of the pre-test slow path flags (e.g., t_pre_test) to ensure that the slow instruction path will be executed during a system call. Examples of kernel routines that affect pre-tests in the pre-test slow instruction path are listed above in connection with step 702 of FIG. 7. Step 906 of FIG. 9(b) indicates that certain kernel routines must set certain ones of the post-test slow path flags (e.g., t_post_test, t_ast_test, or t_signal_check) to ensure that the slow instruction path will be executed during a system call or a TRAP. Examples of kernel routines that affect post-tests in the post-test slow instruction path are listed above in connection with step 702 of FIG. 7. In FIGS. 9(a) and 9(b), it is important that the event flag be set prior to the pre-test or post-test flag in case the routine is interrupted (e.g., by a TRAP) between the two steps.

As shown in step 1002 of FIG. 10, when a thread is first initialized, the thread initializing routine of the kernel sets predetermined slow path flags for the thread (e.g., t_pre_test, t_post_test, and t_ast_test) so that all slow instruction paths will be entered in a first system call or a first TRAP for the thread. (In the described embodiment, the t_signal_check flag 310 is not set until a signal is detected). Predetermined slow path flags for the new thread are initially set because this is simpler than determining the state of other threads in the system prior to a first system call or TRAP for the new thread. For example, if TRACE has previously been turned on for all threads of a process, the slow path flag for all threads in the process should always be set, since TRACE affects all the threads. Thus, in general, when a new thread is initialized, predetermined slow path flags for the new thread are initially set and appropriate slow path flags will be repeatedly set within the tests in the slow instruction path for persistent conditions. (see, e.g., step 704 of FIG. 7).

Conversely, each time control passes through a system call, such as that shown in FIG. 6, the slow path flags will be cleared in steps 604 and 614 and will stay cleared if not set again by a persistent condition, such as TRACE or signal pending. Thus, if no persistent condition exists, a slow path flag is in a cleared state after a first pass through the system call routine of FIG. 6 or through the TRAP routine of FIG. 8. When the slow path flag for a thread is clear, the system calls (and TRAPs) for the thread execute up to five times faster than system calls for the thread in which the slow path flag is set, thus resulting in a large improvement in execution time for the thread.

In a second preferred embodiment, the present invention is included in a system that does not use multi-threading. For example, the present invention can be implemented in a traditional Unix system with only one thread of execution per process. In this embodiment, a data structure such as the data structure of FIG. 3 exists for each process and each process has its own set of slow path flags, similar to those of FIG. 3.

The present invention can be included in a system having multiple processes and/or multiple threads for some processes. Kernel routines exist to set, e.g., predetermined slow path flags for a process, all pre-test flags for a process, all post-test flags for a thread, all pre-test and post-test flags for all threads, etc. For example, TRACE-on calls a kernel routine to set all pre-test and post-test flags for a process but does not set the asynchronous-event flag. Various operating system functions set, clear, and check various combinations of slow path flags as needed.

Several preferred embodiments of the present invention have been described. Nevertheless, it will be understood that various modifications may be made without departing from the spirit and scope of the invention. For example, the invention can be implemented with "fast-path" flags instead of slow path flags. As another example, the invention can include slow instruction paths that include some, but not all pre-tests (or post-tests) performed by a system call or TRAP. Such an implementation is slower than an implementation where all pre-tests (or post-tests) are in a slow instruction path, but faster than conventional systems. In addition, the invention can include several slow instruction paths that overlap each other or that overlap the fast path or that are subsets of other slow instruction paths. For example, in a preferred embodiment, steps 804–812 of FIG. 8 can form a post-test in one of steps 616–618 of FIG. 6 during a system call. In such a case, the signal-check flag and the asynchronous-event flag act as sub-slow path flags, since a main slow path flag was tested in step 612.

In describing the preferred embodiments, a number of specific technologies used to implement the embodiments of various aspects of the invention were identified and related to more general terms in which the invention was described. However, it should be understood that such specificity is not intended to limit the scope of the claimed invention.

What is claimed is:

1. A method for improving an execution time of a system call issued by a software thread in a data processing system, comprising:

initiating the system call of the software thread; and
   performing the system call, including
      checking whether a slow path flag for the thread is set,
      performing, when the slow path flag is set, instructions placed in a slow instruction path, and
      performing, when the slow path flag is clear, instructions placed in a fast instruction path to avoid at least one of a pre-test or a post-test in connection with the system call when the at least one pre-test or post-test is known to be inapplicable.

2. The method of claim 1, wherein the slow instruction path includes a test condition that is not contained in the fast instruction path, and further comprising setting the slow path flag under circumstances affecting the test condition, before the checking of the slow path flag.

3. The method of claim 1, further comprising clearing the slow path flag after the checking of the slow path flag.

4. The method of claim 3, wherein the slow instruction path includes a test condition that is not contained in the fast instruction path, and performing of the slow instruction path includes determining whether the test condition is true and setting the slow path flag when the test condition is true.

5. The method of claim 1, wherein the performing of the system call includes executing instructions of a system call function, and the checking of the slow path flag is performed before the executing of the instructions of the system call function.

6. The method of claim 1, wherein the performing of the system call includes executing instructions of a system call function, and the checking of the slow path flag is performed after the executing of the instructions of the system call function.

7. The method of claim 1, wherein the slow path flag is a t_pre_test flag, indicating whether a test condition should be checked before a system call function is executed.

8. The method of claim 1, wherein the slow path flag is a t_post_test flag, indicating whether a test condition should be checked after a system call function is executed.

9. The method of claim 1, wherein the slow path flag includes a combination of an asynchronous-event flag and a signal-check flag, the combination indicating whether a test condition should be checked after a system call function is executed.

10. The method of claim 1, wherein the instructions in the slow instruction path include a plurality of test conditions to be checked before a system call function is executed.

11. The method of claim 1, wherein the instructions in the slow instruction path include a plurality of test conditions to be checked after a system call function is executed.

12. A method for improving an execution time of a TRAP that is caused by a system event in a data processing system, comprising:

recognizing that an event causing a TRAP condition has occurred, wherein the event interrupts execution of a software thread by the data processing system; and
   processing the TRAP condition, including
      checking whether a slow path flag for the thread is set,
      performing when the slow path flag is set, instructions placed in a slow instruction path, and
      performing, when the slow path flag is clear, instructions placed in a fast instruction path to avoid at least one of a pre-test or a post-test in connection with the system call when the at least one pre-test or post-test is known to be inapplicable.

13. The method of claim 12, wherein the slow instruction path includes a test condition that is not contained in the fast instruction path, and further comprising setting the slow path flag under circumstances affecting the test condition before the checking of the slow path flag.

14. The method of claim 12, further comprising clearing the slow path flag, after the checking of the slow path flag.

15. The method of claim 14, wherein the slow instruction path includes a test condition that is not contained in the fast instruction path, and the performing of the slow instruction path includes determining whether the test condition is true and setting the slow path flag when the test condition is true.

16. The method of claim 12, wherein the processing of the TRAP condition includes executing instructions of a TRAP function, and the checking of the slow path flag is performed before the executing of the instructions of the TRAP function.

17. The method of claim 12, wherein the processing of the TRAP condition includes executing instructions of a TRAP function, and the checking of the slow path flag is performed after the executing of the instructions of the TRAP function.

18. The method of claim 12, wherein the slow path flag is a combination of an asynchronous-events flag indicating whether the event causing the TRAP was caused by an asynchronous event, and a signal-check flag indicating whether the asynchronous event was a signal.

19. The method of claim 18, wherein the performing of the slow instruction path includes:

performing a function to process a pending signal;
   determining whether there are more pending signals in the data processing system corresponding to the thread; and setting the signal-check flag if there are more pending signals.

20. The method of claim 1 or claim 12, wherein the software thread is one of a plurality of software threads executing in a multi-threaded computer system.

21. A method for improving an execution time of a system call issued by a software process in a data processing system, comprising: initiating the system call; and
performing the system call, including
checking whether a slow path flag for the software process is set,
performing, when the slow path flag is set, instructions placed in a slow instruction path, and
performing, when the slow path flag is clear, instructions placed in a fast instruction path to avoid at least one of a pre-test or a post-test in connection with the system call when the at least one pre-test or post-test is known to be inapplicable.

22. An apparatus for improving an execution time of a system call issued by a software thread in a data processing system, comprising:
circuitry performing one or more software thread instructions forming a part of the software thread, where the software thread instructions include the system call;
circuitry checking whether a slow path flag corresponding to the software thread is set;
circuitry performing, when the slow path flag is set, instructions placed in a slow instruction path of the system call; and
circuitry performing, when the slow path flag is clear, instructions placed in a fast instruction path of the system call to avoid at least one of a pre-test or a post-test in connection with the system call when the at least one pre-test or post-test is known to be inapplicable.

23. An apparatus for improving the execution time of a TRAP that is caused by a system event in a data processing system, comprising:
a memory storing a slow path flag for a software thread;
circuitry recognizing that an event causing a TRAP condition has occurred, wherein the event causes execution of the software thread to become interrupted;
circuitry checking whether a slow path flag corresponding to the thread is set;
circuitry performing, when the slow path flag is set, instructions placed in a slow instruction path of the TRAP; and
circuitry performing, when the slow path flag is clear, instructions in placed a fast instruction path of the TRAP to avoid at least one of a pre-test or a post-test in connection with the system call when the at least one pre-test or post-test is known to be inapplicable.

24. An apparatus for improving an execution time of a system call issued by a software process, comprising:
a memory storing a slow path flag for the software process;
circuitry performing software process instructions of the software process, the software process instructions including the system call;
circuitry checking whether a slow path flag for the process is set;
circuitry performing, when the slow path flag is set, instructions placed in a slow instruction path of the system call; and
circuitry performing, when the slow path flag is clear, instructions placed in a fast instruction path of the system call to avoid at least one of a pre-test or a post-test in connection with the system call when the at least one pre-test or post-test is known to be inapplicable.

25. A computer system executing a plurality of software threads, comprising:
a memory storing a first slow path flag corresponding to a first thread and a second slow path flag corresponding to a second thread;
circuitry performing first thread instructions of the first software thread, the first thread instructions including a first system call;
circuitry performing second thread instructions of the second software thread, the second thread instructions including a second system call;
circuitry checking whether a slow path flag corresponding to the first thread is set;
circuitry checking whether a slow path flag corresponding to the second thread is set;
circuitry performing, when the first slow path flag is set, instructions placed in a slow instruction path corresponding to the first system call;
circuitry performing, when the first slow path flag is clear, instructions placed in a fast instruction path corresponding to the first system call to avoid at least one of a pre-test or a post-test in connection with the first system call when the at least one pre-test or post-test is known to be inapplicable;
circuitry performing, when the second slow path flag is set, instructions placed in a slow instruction path corresponding to the second system call; and
circuitry performing, when the first slow path flag is clear, instructions placed in a fast instruction path corresponding to the second system call to avoid at least one of a pre-test or a post-test in connection with the second system call when the at least one pre-test or post-test is known to be inapplicable.

26. A method, in a processing system employing threads and at least one of system calls and TRAPs that is capable of being initiated in conjunction with execution of a plurality of the threads, comprising:
determining at least one of a pre-test and a post-test that, while executed in conjunction with performing at least one of the system calls and TRAPs during ongoing processing system operation, can be rendered inapplicable during a selectable processing of the at least one of the system calls and TRAPs;
providing a slow instruction path and a fast instruction path;
placing the at least one of a pre-test and a post-test in the slow instruction path and excluding the at least one of a pre-test and a post-test from the fast instruction path;
designating a slow path flag that is capable of being set such that instructions in the slow instruction path will be executed during the at least one of the system calls and TRAPs, and that is capable of being cleared such that instructions in the fast instruction path will be executed during the at least one of the system calls and TRAPs.

27. A slow instruction path formed according to the method of claim 26.

* * * * *